US010362568B2

(12) United States Patent
Guo et al.

(10) Patent No.: US 10,362,568 B2
(45) Date of Patent: Jul. 23, 2019

(54) HIGH-SPEED CAPTURE AND ANALYSIS OF DOWNLINK DATA IN A TELECOMMUNICATIONS SYSTEM

(71) Applicant: CommScope Technologies LLC, Hickory, NC (US)

(72) Inventors: Zhen Guo, Forest, VA (US); Zhao Li, Forest, VA (US); Roger Doles, Jr., Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/521,581

(22) PCT Filed: Oct. 29, 2015

(86) PCT No.: PCT/US2015/057944
§ 371 (c)(1),
(2) Date: Apr. 24, 2017

(87) PCT Pub. No.: WO2016/073263
PCT Pub. Date: May 12, 2016

(65) Prior Publication Data
US 2017/0311297 A1 Oct. 26, 2017

Related U.S. Application Data

(60) Provisional application No. 62/076,282, filed on Nov. 6, 2014.

(51) Int. Cl.
*H04W 72/04* (2009.01)
*H04B 7/155* (2006.01)
(Continued)

(52) U.S. Cl.
CPC ........ *H04W 72/042* (2013.01); *H04B 1/0007* (2013.01); *H04B 7/04* (2013.01);
(Continued)

(58) Field of Classification Search
None
See application file for complete search history.

(56) References Cited

U.S. PATENT DOCUMENTS 6,496,873 B1 * 12/2002 Brunet ................ G06F 3/16
710/260
7,848,287 B2 * 12/2010 Diachina ............ H04L 1/1838
370/252

(Continued)

FOREIGN PATENT DOCUMENTS

WO     2011109218 A1     9/2011

OTHER PUBLICATIONS

International Search Authority, "International Search Report and Written Opinion for PCT Application No. PCT/US2015/057944", dated Feb. 15, 2016, pp. 1-14, Published in: WO.

(Continued)

*Primary Examiner* — Michael J Moore, Jr.
(74) *Attorney, Agent, or Firm* — Fogg & Powers LLC (57) ABSTRACT

Certain features relate to optimizing the processing of downlink data in a telecommunications system by capturing a downlink data stream and transferring the downlink data to a memory device in parallel. A processing device can capture a first set of downlink data blocks from a base station and store the first set of downlink data blocks to a memory device. Once a sufficient number of downlink data blocks are written to the memory device, the first set of data blocks can be transferred to a digital signal processor. A second set of data blocks can be captured substantially simultaneous to the first set of data blocks being transferred to the digital signal processor. In additional aspects, the second set of data blocks can be processed by the digital signal processor substantially simultaneous to additional data blocks being captured and stored in the memory device.

20 Claims, 4 Drawing Sheets

(51) Int. Cl.
*H04B 1/00* (2006.01)
*H04B 7/04* (2017.01)
*H04W 84/04* (2009.01)
*H04W 88/08* (2009.01)

(52) U.S. Cl.
CPC ........ *H04B 7/155* (2013.01); *H04W 72/0453* (2013.01); *H04W 84/042* (2013.01); *H04W 88/08* (2013.01)

(56) References Cited

U.S. PATENT DOCUMENTS

| | | | | |
|---|---|---|---|---|
| 7,904,618 | B2* | 3/2011 | Inoue | G06F 5/10 710/54 |
| 7,974,227 | B1* | 7/2011 | Seay | H04L 63/102 370/315 |
| 8,769,192 | B2* | 7/2014 | Yeh | G06F 3/0611 365/189.04 |
| 8,965,173 | B2* | 2/2015 | Barton | H04N 5/775 386/235 |
| 2002/0173338 | A1* | 11/2002 | Neumann | H04M 1/725 455/552.1 |
| 2002/0176118 | A1* | 11/2002 | LaRocca | G06F 17/147 358/426.06 |
| 2005/0124330 | A1 | 6/2005 | Hong et al. | |
| 2007/0025471 | A1 | 2/2007 | Chen et al. | |
| 2010/0174521 | A1* | 7/2010 | Pontius | G06F 17/5027 703/15 |
| 2011/0035522 | A1 | 2/2011 | Tan et al. | |
| 2011/0087850 | A1* | 4/2011 | Kawada | G06F 3/0611 711/162 |
| 2012/0265883 | A1* | 10/2012 | Abts | G06F 13/124 709/226 |
| 2013/0252617 | A1 | 9/2013 | Erceg et al. | |
| 2014/0094157 | A1 | 4/2014 | Nguyen et al. | |

OTHER PUBLICATIONS

European Patent Office, "Extended European Search Report from EP Application No. 15856197.7 dated May 29, 2018", "From Foreign Counterpart of U.S. Appl. No. 15/521,581", May 29, 2018, pp. 1-8, Published in: EP.

International Bureau of WIPO; Notification Concerning Transmittal of International Preliminary Report on Patentability from PCT Application No. PCT/US2015/057944 dated May 18, 2017; pp. 1-11; Published: Switzerland.

* cited by examiner

HIGH-SPEED CAPTURE AND ANALYSIS OF DOWNLINK DATA IN A TELECOMMUNICATIONS SYSTEM

CROSS-REFERENCE TO RELATED APPLICATIONS

This application is a U.S. National Stage application of PCT Application Serial No. PCT/US2015/057944, filed Oct. 29, 2015, and titled "High-Speed Capture and Analysis of Downlink Data in a Telecommunications System," which claims the benefit of U.S. Provisional Application Ser. No. 62/076,282, filed on Nov. 6, 2014, and titled "High-Speed Capture and Analysis of Downlink Data in a Telecommunications System," the contents of all of which are hereby incorporated by reference.

TECHNICAL FIELD

The disclosure relates generally to telecommunications and, more particularly (although not necessarily exclusively), to a high-speed data capture device for transferring downlink data into memory substantially simultaneous to the data capture.

BACKGROUND

In a telecommunications system, such as a distributed antenna system (DAS) or a repeater installation, wireless signals carrying communication information can be transported between a base station and user devices. A DAS or a repeater can be used to extend wireless coverage in an area. For example, a DAS can extend wireless coverage through the use of one or more head-end units and multiple remote units coupled to each head-end unit. Head-end units can be coupled to one or more base stations that can each manage wireless communications for different cell sites. A head-end unit can receive downlink RF signals from the base station and distribute downlink signals in analog or digital form to one or more remote units. The remote units can transmit the downlink signals to user devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base stations.

As RF downlink signals are provided from the base stations to head-end units and converted into a digital format, a measurement receiver can capture the incoming downlink data and transfer the data into the head-end unit system memory. The data can then be processed by a processing module to identify the contents of the data. For example, the head-end unit can determine if the data pertains to system control information or DAS voice data or other user data. But, capturing an entire downlink data stream before transferring the data stream to system memory can add latency to the DAS. A faster process for capturing downlink data, reading into system memory, and processing the data can result in faster system configuration times, less system latency experienced by the user, and an overall improved user experience.

SUMMARY

In one aspect, a telecommunications system is provided. The telecommunications system can include a unit that includes an analog-to-digital converter configured for receiving wireless communication signals from a base station. The analog-to-digital converter digitizes the wireless communication signals into a first set of downlink data blocks and a second set of downlink data blocks. The telecommunications system can also include a first processing device, a memory device, and a second processing device communicatively coupled between the analog-to-digital converter, the memory device, and the first processing device. The telecommunications system can also include a non-transitory computer readable medium communicatively coupled to the second processing device, the non-transitory computer readable medium including program code. The program code can include code for capturing the first set of downlink data blocks. The program code can also include code for storing the first set of downlink data blocks to a memory device. The program code can also include code for transferring the first set of downlink data blocks to the first processing device subsequent to a selected number of data blocks being stored in the memory device. The program code can also include code for capturing the second set of downlink data blocks substantially simultaneously to transferring the first set of downlink data blocks to the first processing device.

In another aspect, a method is provided. The method can include capturing a first set of digitized downlink data blocks representative of information carried by a radio frequency signal received from a base station. The method can also include writing the first set of digitized downlink data blocks to a memory device. The method can further include transferring the first set of digitized downlink data blocks to a first processing device subsequent to a selected number of data blocks being stored in the memory device. The method can also include capturing a second set of digitized downlink data blocks substantially simultaneously to transferring the first set of digitized downlink data blocks to the first processing device.

In another aspect, a head-end unit is provided. The head-end unit can include an analog-to-digital converter configured for receiving wireless communication signals from a base station and digitizing the wireless communication signals into a first set of downlink data blocks and a second set of downlink data blocks, the first set of downlink data blocks and the second set of downlink data blocks representative of information carried by a radio frequency signal received from a base station. The head-end unit can also include a first processing device, a memory device, and a second processing device communicatively coupled between the analog-to-digital converter, the memory device, and the first processing device. The second processing device can be configured to capture the first set of downlink data blocks from the analog-to-digital converter. The second processing device can also be configured to store the first set of downlink data blocks to the memory device. The second processing device can also be configured to transfer the first set of downlink data blocks to a first processing device subsequent to a selected number of data blocks being stored in the memory device. The second processing device can further be configured to capture the second set of downlink data blocks substantially simultaneously to transferring the first set of digitized downlink data blocks to the first processing device.

DETAILED DESCRIPTION

Certain aspects and features relate to optimizing the capture and analysis of downlink data in a telecommunications system. Examples of a telecommunications system can include a distributed antenna system (DAS), repeater installation, or a centralized radio access network (C-RAN), among others. For example, according to certain aspects, a DAS head-end unit or an extension unit can be configured to include a memory device and a memory controller that can capture a downlink stream from a base station and transfer the downlink data to the head-end unit or extension unit memory in parallel. An example of a memory device can include a Double Data Rate type three ("DDR3") memory, and an example of a memory controller can include a DDR3 controller. Once a minimum threshold of downlink data has been captured by the memory controller, the partially received data can be transferred into the memory device substantially simultaneous to capture of the remaining downlink data. The data capture rate of the measurement receiver can be faster than the data transfer rate to the system memory. The DAS head-end unit or extension unit can also begin processing the partially transferred data before the entire data stream is transferred to memory and substantially simultaneous to capture of the remainder of the data stream. By reading partially received downlink data into the memory device substantially simultaneous to the data capture, the head-end unit or extension unit does not have to wait for the entire data stream to be captured, allowing for faster analysis of the downlink data and reducing overall latency of the DAS.

For example, capturing and reading a complete downlink GSM signal into system memory can take three seconds. According to certain aspects, a memory controller can begin reading captured GSM data into system memory after a minimum threshold of 512 blocks of GSM data are captured (262,144 bytes of data). A measurement receiver can capture 512 blocks of GSM data in 83 msec (at a capture rate of 781.25K samples/sec). Instead of waiting for the full data stream to be captured, a memory controller can begin reading the 512 blocks of downlink GSM data into memory after 83 msec. This can save more than a full second in decoding and processing the GSM signal.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

Figure 1:
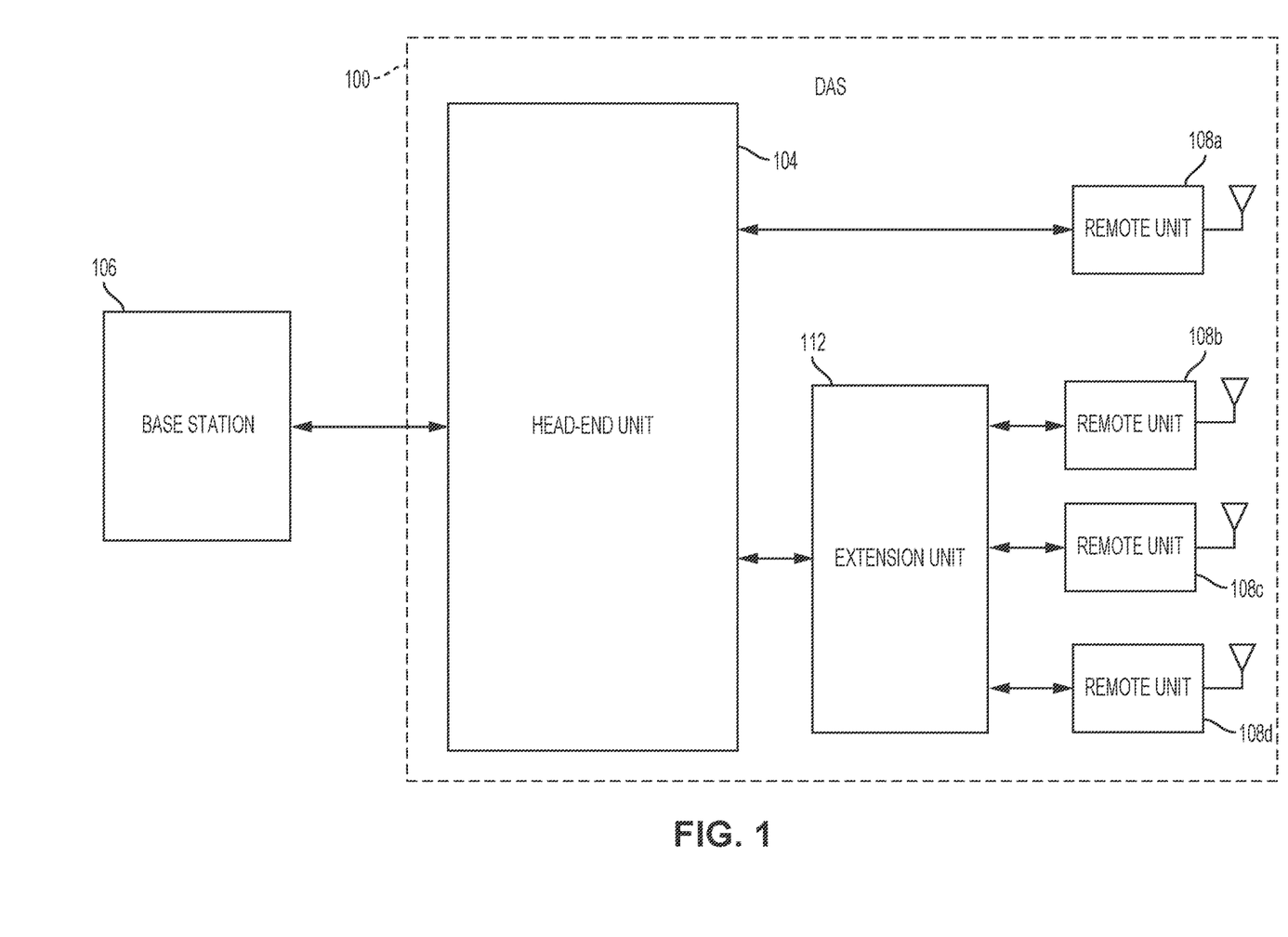
FIG. 1 is a block diagram of an example of a distributed antenna system (DAS) according to one aspect of the present disclosure.

FIG. 1 is a block diagram of a DAS according to some aspects and features of the subject matter herein. While a DAS is shown for illustrative purposes, the aspects and features shown in FIG. 1 can be implemented in any suitable telecommunications system, such as a repeater installation or a C-RAN. The DAS can include a network of spatially separated remote units 108a-d communicatively coupled to a head-end unit 104 according to one aspect. The head-end unit 104 can provide communication between a base station 106 and the remote units 108a-d. The DAS 100 can be designed to transport wireless communication between the base station 106 and user devices positioned in coverage ones of respective remote units 108a-d. In some aspects, remote units 108a-d can be coupled directly to the head-end unit 104. In other aspects, the head-end unit can be coupled to remote units via an extension unit 112, which can expand the number of remote units to which the head-end unit 104 can communicate.

For illustrative purposes, FIG. 1 depicts a DAS 100 that communicates with one base station 106 and that includes a single head-end unit 104 and four remote units 108a-d. A DAS according to various aspects and features can communicate with any number of base stations and can include any suitable number of head-end units and remote units. A DAS can also serve any number of coverage zones.

The head-end unit 104 can receive downlink signals from the base station 106 and transmit uplink signals to the base station 106. Any suitable communication link can be used for communication between base station 106 and head-end unit 104. For example, a direct connection or a wireless connection can be used for communication between the base station 106 and the head-end unit 104. A direct connection can include, for example, a connection via a copper, optical fiber, or other suitable communication medium. In some aspects, the head-end unit 104 can include an external repeater or internal RF transceiver to communicate with the base station 106. In some aspects, the head-end unit 104 can combine downlink signals received from different base stations. The head-end unit 104 can transmit the combined downlink signals to one or more of the remote units 108a-d.

The remote units 108a-d can provide signal coverage to user equipment devices by transmitting downlink signals to the user equipment devices and receiving uplink signals from the user equipment devices. The remote units 108a-d can transmit uplink signals to the head-end unit 104. The head-end unit 104 can combine uplink signals received from remote units 108a-d for transmission to the base station 106.

Figure 2:
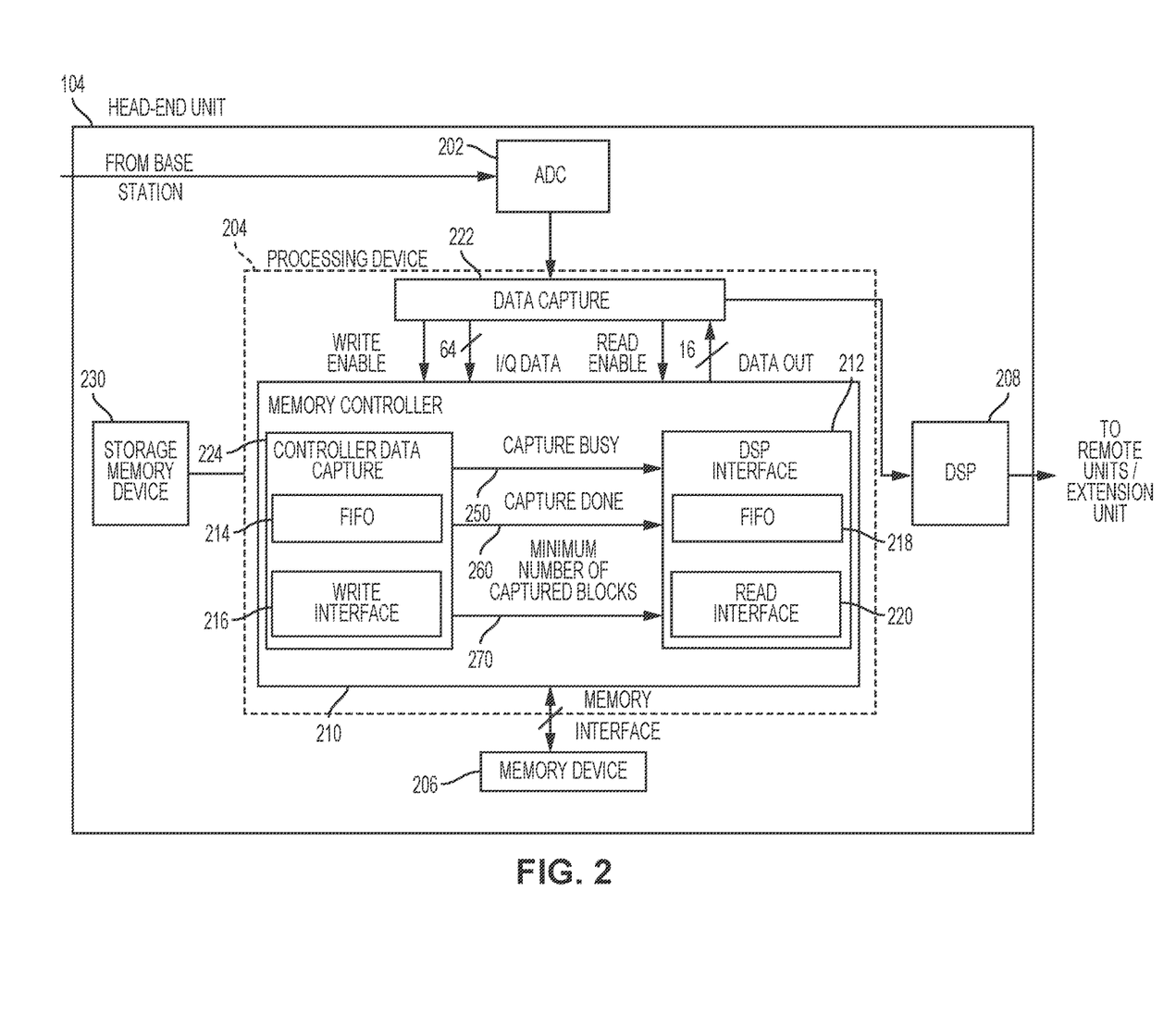
FIG. 2 is a block diagram of an example of a head-end unit that includes a high-speed data capture and analysis device according to one aspect of the present disclosure.

As downlink RF signals are provided from the base station 106 to the head-end unit 104, the head-end unit 104 can digitize the data via an analog-to-digital converter and captures the digitized downlink data into system memory. After a minimum threshold of downlink data is captured into memory, the head-end unit 104 can begin reading the data from memory by transferring the data to a digital signal processing (DSP) device for processing or other general-purpose processing device. The DSP in the head-end unit 104 can process the received data to determine which of the remote units 108a-d should receive the downlink data from the base station 106. FIG. 2 is a block diagram depicting an example of a DAS 100 configured to capture downlink data and process downlink data in parallel according to aspects and features disclosed herein.

Downlink RF signals received from the base station 106 can be provided to an analog-to-digital converter (ADC) 202 in FIG. 2. The ADC 202 can convert the received analog RF signals from the base station 106 to a digital stream. To capture and process the downlink data in parallel, the head-end unit 104 can include a processing device 204 communicatively coupled to the ADC 202 and a DSP 208.

The processing device 204 can be configured to include programmable logic for a data capture module 222, a memory controller 210, and a memory device 206. Any suitable dynamic random-access memory with high-speed data transfer rates can be used as memory device 206. For example, the memory device 206 can be implemented as a DDR3 Synchronous Dynamic Random Access Memory (SDRAM) due to its high data-transfer bandwidth. Likewise, memory controller 210 can be implemented as a DDR3 controller, and data capture module 222 can be configured as a DDR3 data capture module. Examples of the processing device 204 can include a field programmable gate array (FPGA) or an application specific integrated circuit (ASIC). The head-end unit 104 can further include a storage memory device 230 communicatively coupled to the processing device 204. The storage memory device 230 can include any non-transitory media for storing program code defining the operations of the processing device 204. Non-limiting examples of storage memory device 230 can include read-only memory (ROM), random-access memory (RAM), optical storage, magnetic storage, flash memory, or any other medium from which the processing device 204 or other processing device can read program code.

The programmable logic included in the processing device 204 for controlling the data capture module 222 and the memory controller 212 can be configured to transfer incoming downlink data to the DSP 208 for processing once a minimum number of data blocks are received. Data blocks can include sets of digital data sized and formatted according to data rate from the ADC 202 and modulation scheme in the telecommunications system. For example, the data capture module 222 can transfer data as 64-bit I/Q data, so data captures may be in multiple of 64-bit data blocks. The ADC 202 can provide 12-bit real samples that may be converted to quadrature samples and stored as 16-bit I and 16-bit Q data in the 64-bit data blocks. Other implementations are possible for data blocks of different formats and sizes.

The processing device 204 can continue capturing and storing additional data blocks substantially simultaneous to the initial set of data blocks being transferred to the DSP 208. For example, the data capture module 222 implemented in the processing device 204 can include a series of registers that can funnel the captured downlink data to the memory controller 210 in the form of 64 bit I/Q data blocks for storage in the memory device 206. The data capture module 222 can also include a processing device register that can store an indication that a selected minimum number of downlink data blocks from a base station 106 downlink data stream have been captured and stored in memory device 206. Subsequent to the selected minimum number of data blocks being stored in memory device 206, the processing device 204 can continue capturing additional data blocks from the analog-to-digital converter 202 and storing the additional data blocks to memory device 206. The processing device 204 can capture additional data blocks simultaneous to, or substantially simultaneous to, the initial set of data blocks being transferred from the memory device 206 to the DSP 208. The transfer from the memory device 206 to the DSP 208 can occur at a different data transfer rate to the capture and storage of data blocks from the analog-to-digital converter 202 to the memory device 206. As such, the transfer from the memory device 206 to the DSP 208 (transfer speed) can occur parallel to the capture and storage of additional data blocks from the analog-to-digital converter 202 to the memory device 206 (capture speed), but the transfer may be offset by a certain factor depending on the relative capture and transfer speeds.

For example, if the transfer speed is at a faster data rate than the capture speed, capture and storage of the data blocks to the memory device 206 may be provided enough of a head start offset so that data transfer to the DSP 208 does not catch up to the data capture and storage to the memory device 206. If data transfer to the DSP 208 catches up to the data capture and storage to the memory device 206, a buffer underrun error may occur. If the transfer speed is slower than the capture speed, transfer to the DSP 208 may begin after a minimal amount of data is captured and stored to the memory device 206. The DSP 208 may begin processing transferred data blocks after a sufficient amount of data is transferred. For example, for a GSM data signal (in which full data capture can take 2200 ms), the DSP 208 may begin processing transferred data blocks after 83 ms of data is transferred.

The amount of data blocks that constitute a minimum number of data blocks can be selected and set in a processing device 204 register by software in the DSP 208. The selected minimum number of data blocks can be customized depending on the performance of the processor-to-DSP data transfer mechanism. For example, the selected minimum number of data blocks may be based on the rate of data transfer from the processing device 204 to the memory device 206 or from the memory device 206 to the DSP 208. The selected minimum number of data blocks may be inversely proportional to the rate of data transfer from the processing device 204 to the DDR3 memory device 206 or from the memory device 206 to the DSP 208. For example, for faster performing processor-to-DSP transfers, fewer selected minimum number of data blocks may be required. In some aspects, the processing device 204 can automatically detect the rate of data transfer from the processing device 204 to the memory device 206 and from the memory device 206 to the DSP 208 and configure the register that sets the selected minimum number of captured data blocks accordingly. The processing device 204 can detect the rate of data transfer, for example, by measuring the data rate of data blocks output to the DSP 208 and comparing the output data rate against the rate of data blocks written to the memory device 206.

The processing device 204 can also include a memory controller 210, which can be configured with the program code to manage the transfer of the downlink data blocks from the data capture block 222 to the memory device 206. The memory controller 210 can also manage the transfer of the downlink data blocks from the memory device 206 to the DSP 208 for further processing. The memory controller 210 can include a controller data capture block 224 and a DSP interface block 212. The controller data capture block 224 can write the downlink data blocks from the data capture module 222 into the memory device 206. In some aspects, a write-enable signal from the data capture module 222 can instruct the controller data capture block 224 to write the downlink data blocks to the memory device 206. Once a sufficient number of data blocks are written to the memory device 206, the DSP interface block 212 can be used to read the data out of the memory device 206 to the DSP 208.

The controller data capture block 224 can include a first-in-first-out (FIFO) data structure 214 and a write interface 216. The write interface 216 can interface with the memory device 206. As downlink I/Q data blocks are funneled from the data capture module 222 to the memory controller 210, the I/Q data blocks can queue and output through the FIFO data structure 214 to the memory device 206 via the write interface 216. As the controller data capture block 224 writes data blocks from the data capture module 222 to the memory device 206, the controller data capture block 224 can send a signal 250 to the DSP interface 212 indicating that data capture is in progress. Program code executing in the processing device 204 or the DSP 208 can indicate when the selected minimum number of data blocks have been written to the memory device 206. For example, to determine whether the selected minimum number of data blocks have been written to memory device 206, the processing device 204 can first determine whether the next data block for transfer to the DSP 208 will surpass the amount of data captured and stored in the memory device 206 (to avoid a buffer underrun error). If data transfer would not surpass the amount of data stored in the memory device 206 (or if data transfer is slower than data capture), the processing device 204 can also determine whether the data captured and stored in memory device 206 carries sufficient data to decode a periodic field in the RF signal. A periodic field includes an indication that active carrier information is present in a given sample of data blocks. The amount of data required to decode a periodic field can vary by air interface standard. If the processing device 204 determines a periodic field is present and a buffer underrun error would not occur, the processing device 204 may determine that a selected minimum number of data blocks have been written to memory device 206. Once a selected minimum number of data blocks have been written to the memory device 206, the controller data capture block 224 can provide a signal 260 indicating that data capture is complete and a signal 270 that a selected minimum number of blocks have been captured. The DSP interface 212 can include a read interface 220 that is an interface to the memory device 206 and a FIFO data structure 218. In response to receiving signal 270 indicating that a selected minimum number of data blocks have been captured, the read interface 220 can read the data blocks from the memory device 206 and add the read data blocks to the FIFO data structure 218. The FIFO data structure 218 can output the downlink data blocks as 16 bit I/Q streams to the DDR3 data capture module 222, which can forward the downlink data blocks to the DSP 208 for processing.

Simultaneous, or substantially simultaneous, to the DSP interface 212 reading the data blocks from the memory device 206 to the DSP 208, the data capture module 222 can continue to funnel additional incoming data blocks through the FIFO data structure 214 in the controller data capture block 224. Further, the data capture block 224 can continue to write the additional received data blocks to the memory device 206. The downlink data stream from the base station 106 can be read into the memory device 206 and written to the DSP 208 in parallel. Capturing downlink data into the memory device 206 and reading the downlink data into the DSP 208 in parallel can significantly reduce the latency of the head-end unit 104 and overall DAS 100.

Figure 3:
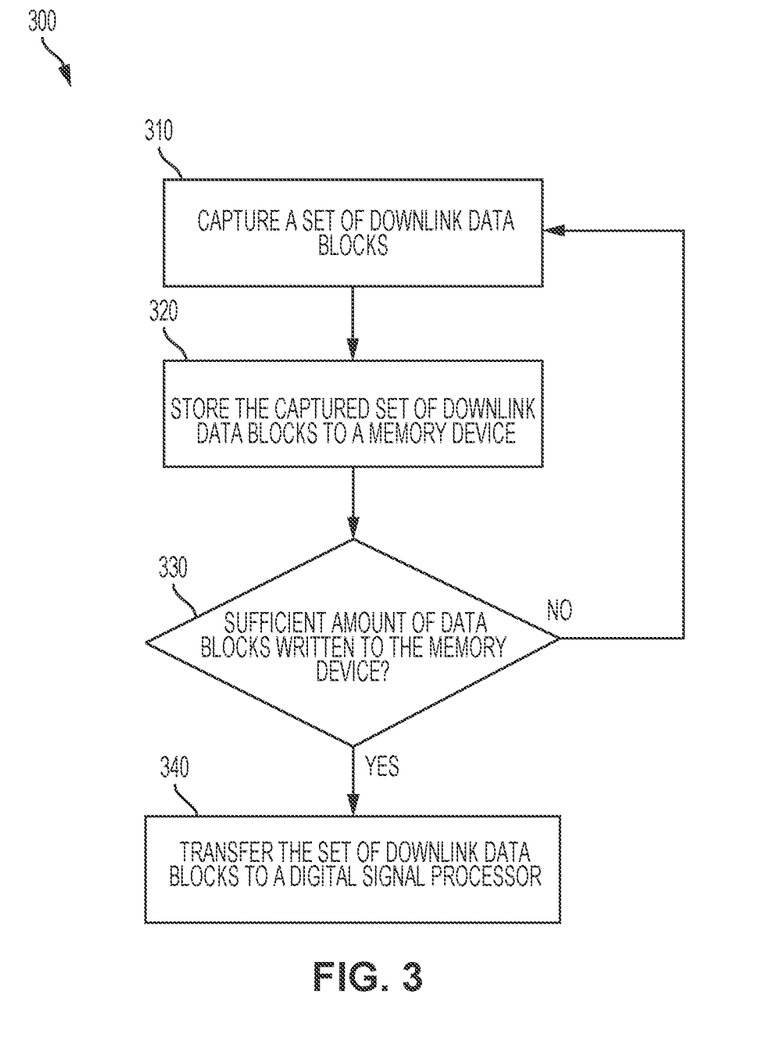
FIG. 3 is a flowchart depicting an example of a process for capturing and reading into memory a downlink data stream in parallel according to one aspect of the present disclosure.

As mentioned above, program code executing in the processing device 204 can control the modules depicted in FIG. 2 to capture downlink data into memory and read downlink data into the DSP 208 in parallel. The downlink data read into the DSP 208 can be processed substantially simultaneous to additional data being read into memory. FIG. 3 is a flowchart showing an example of a process 300 implemented in the processing device 204 for capturing and reading into memory a downlink data stream in parallel.

Process 300 can include the capturing a set of downlink data blocks, as shown in block 310. As discussed above with respect to FIG. 2, the data capture module 222 can include a series of registers that transfer incoming downlink data from the ADC 202 to the memory controller 210. The data capture module 222 can begin capturing downlink data from the ADC 202 (e.g., receiving digitized downlink data from the ADC 202 and transferring the downlink data to the memory controller 210) automatically upon detection of incoming downlink data.

Process 300 can also include storing the captured set of downlink data blocks to a memory device, as shown in block 320. For example, the processing device 204 can be configured with program code to transfer the downlink data temporarily stored in the registers of the data capture module 222 to a FIFO data structure 214 in the controller data capture block 224. The processing device 204 can de-queue the FIFO data structure 214 and provide the de-queued data to the memory device 206 via a write interface 216.

Process 300 can further include determining whether a selected minimum number of data blocks have been written to the memory device, as shown in block 330. For example, as discussed above with respect to FIG. 2, the amount of data blocks that constitute a selected minimum number of data blocks can be determined by the DSP 208 and can be set in a processing device 204 register by software in the DSP 208. The DSP 208 can determine the amount of selected minimum number of data blocks based on the air interface standard and based on the relative capture speed to the memory device 206 and transfer speed to the DSP 208. In response to the selected minimum number of data blocks being transferred to the memory device 206, the controller data capture block 224 can provide a signal indicating that the selected minimum number of blocks have been captured to the DSP interface 212. If a selected minimum number of data blocks have not been captured and transferred to the memory device 206, the data capture module 222 can continue to capture additional downlink data blocks that the controller data capture block 224 stores in the memory device 206.

The processing device 204 can determine whether a selected minimum number of data blocks have been written to the memory device 206 by any suitable manner. For example, as discussed above, the processing device 204 may determine that a selected minimum number of data blocks have been written to the memory device 206 by determining that a buffer underrun error would not occur upon data transfer and that a periodic field is detected in the sample of stored data blocks. In other aspects, the processing device 204 can determine the selected minimum number of data blocks based on the overall size of the data capture or based on the sample rate. For example, the processing device 204 can maintain a counter tracking the number of data blocks received from the data capture module 222 or output from the FIFO data structure 214 to the memory device 206. When the selected minimum number of data blocks is received from the data capture module 222 or output from the FIFO data structure 214, the processing device 204 can provide the signal indicating that the selected minimum number of blocks have been captured to the DSP interface 212 and reset the counter.

Once the selected minimum number of data block have been stored in memory, the processing device 204 can execute program code to transfer the set of downlink data blocks from the memory device 206 to the DSP 208, as shown in block 340. For example, the DSP interface 212, can read the data blocks from the memory device 206 via a read interface 220 and queue the read data blocks in a FIFO data structure 218. As the data blocks are de-queued from the FIFO data structure 218 once the FIFO data structure 218 is full, the data blocks can pass through the data capture module 222 to the DSP 208.

As the downlink data blocks are transferred to the DSP 208, the processing device 204 can continue to capture the next set of downlink data blocks from the ADC 202 in parallel. For example, the DSP interface can read a first set of downlink data blocks from the memory device 206 and transfer the first set of downlink data blocks through the FIFO data structure 218 to the DSP 208. In parallel, the controller data capture block 224 can receive a subsequent set of downlink data blocks from the data capture module 222 and transfer the subsequent set of downlink data blocks through the FIFO data structure 214 to the memory device 206.

Figure 4:
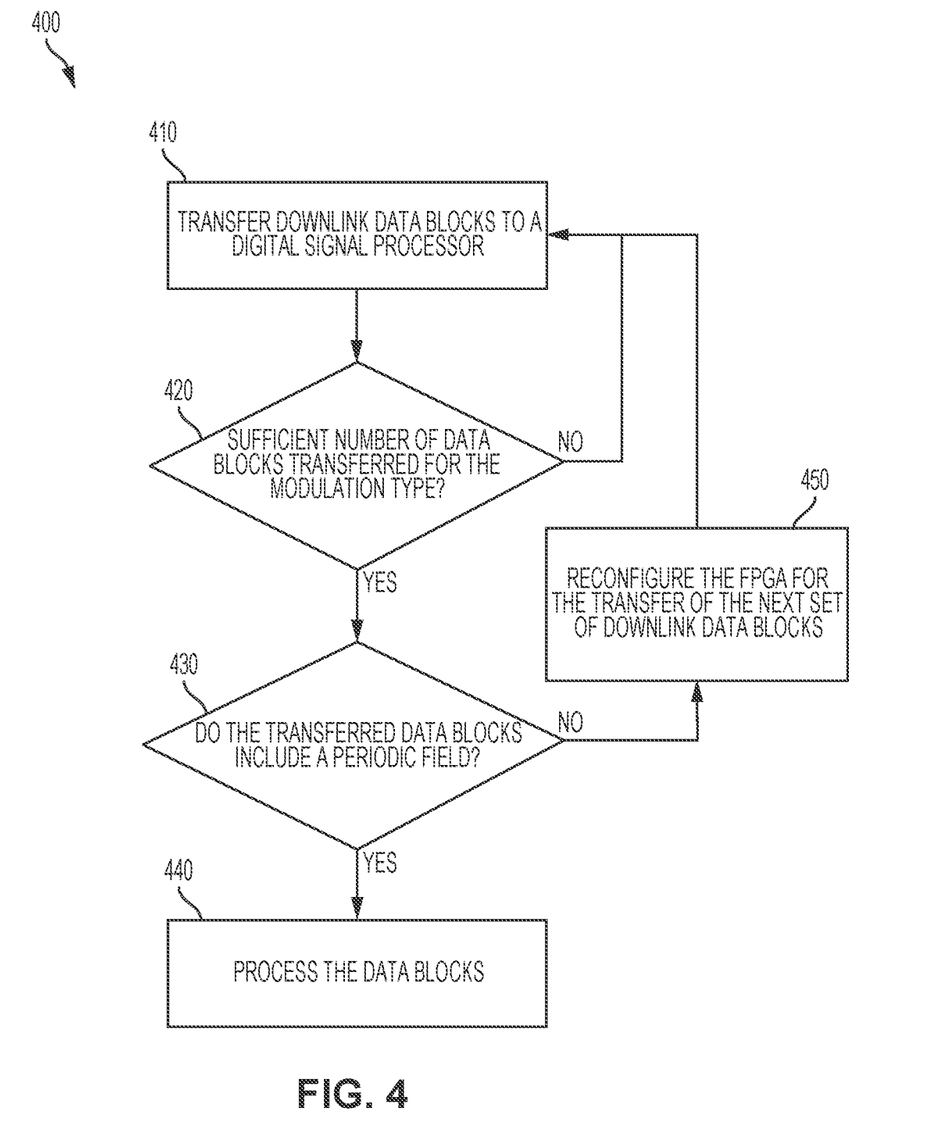
FIG. 4 is a flowchart showing an example of a process for processing a portion of captured data substantially simultaneously to additional data being captured and transferred to a first processing device in parallel according to one aspect of the present disclosure.

In some aspects, as the downlink data blocks are captured from the base station 106 and read to the DSP 208 via the process described with respect to FIG. 3, the DSP 208 can begin processing the downlink data blocks in parallel to writing a subsequent set of data blocks to the memory device 206. The DSP 208 can also begin processing a partial set of downlink data blocks in parallel to the transfer of the data blocks to the DSP 208. In such aspects, the DSP 208 can begin processing partially transferred data before waiting for the entire data stream to be provided to the DSP 208. FIG. 4 is a flowchart showing an example of a process 400 for processing a portion of the captured data in the DSP 208 substantially simultaneously to additional data being captured and read to the DSP 208 in parallel.

In some examples, the process 400 can begin at the end of process 300 with downlink data blocks being transferred to the DSP 208, as shown in block 410. Downlink data blocks can be transferred to the DSP 208 in the manner described above with respect to block 340.

Once downlink data blocks are transferred to the DSP 208, the DSP 208 or the processing device 204 can determine if a selected minimum number of data blocks have been transferred for the given modulation type, as shown in block 420. For example, as the head-end unit 104 can be implemented in a DAS 100 that communicates data of varying modulation types, program code executing in the DSP 208 can calculate the minimum number of blocks of data required for the DSP 208 to begin processing the data for specific modulation types. In other aspects, a register in the processing device 204 can indicate when the minimum number of blocks has been transferred to the DSP 208 to begin processing of the data. The processing device 204 can provide a signal to the DSP 208 instructing the DSP 208 to begin processing the data. In another aspect, software executing in the DSP 208 and track the amount of transferred data to the DSP 208.

Once the minimum number of blocks for processing has been transferred, the DSP 208 can analyze the received data blocks to determine if the transferred data blocks include a periodic field, as shown in block 430. If the transferred data blocks do not include a periodic field, the DSP 208 can reconfigure the processing device 204 for the transfer of the next set of downlink data blocks to the DSP 208, as shown in block 450. For example, the DSP 208 can reconfigure the processing device 204 for the transfer of a next set of data blocks by enabling a read enable register in the data capture module 222. Upon detecting that the read enable register is enabled, the data capture module 222 can transfer the next set of data blocks from the memory device 206 to the DSP 208 via the process described above.

Once the DSP 208 detects that the transferred data blocks do include a periodic field, the DSP 208 can process the data blocks, as shown in block 440. For example, the DSP 208 can demodulate and decode the data blocks to determine which remote unit(s) 108a-d should receive the wireless communication. By processing the data blocks, the DSP 208 can also determine cell-related information in the downlink signal. Cell-related information can include cell ID, scrambling sequence number, system ID, mobile country code, mobile network code, and other information depending on the air interface standard (e.g., whether the signal being processed is LTE, UMTS, CDMA2K, GSM, etc). As the DSP 208 processes the received set of data blocks, additional data blocks can be captured and stored in the memory device 206 via the process described above with respect to FIG. 3. Similarly, as the DSP 208 processes the received set of data blocks, a subsequent set of data blocks can be transferred to the DSP 208 from the memory device 206 in parallel via the process described above with respect to blocks 340 and 410.

While aspects discussed above utilize a DSP 208 for illustrative purposes, a general-purpose processing device can also be used to process data in parallel to data capture. For example, a first general-purpose processing device can be used in place of a DSP 208. A second general-purpose processing device (e.g., processing device 204) can be used to facilitate the capture and storing of data blocks from ADC 202 to memory device 206. Once a selected minimum number of data blocks are stored in memory device 206 (as discussed above), the second general-purpose processing device can transfer the data blocks to the first general-purpose processing device for processing.

In other aspects, data capture to the memory device 206 may occur substantially simultaneously to processing of a selected minimum number of data blocks without requiring transfer of the data blocks to the DSP 208. For example, processing device 204 and DSP 208 may be included as a System-On-Chip (SoC) package. In a SoC package, the logic for the processing device 204 and the DSP 208 may be included in the same device. In an SoC arrangement, data transfers from the processing core logic to the DSP core logic may not be required, as the processing logic and DSP logic may operate from the same memory. As another example, transfer of data blocks to the DSP 208 may not be required in implementations where processing device 204 and DSP 208 utilize a single shared memory. In these aspects, an SoC device or a DSP 208 that utilizes shared memory with a processing device 204 may begin processing downlink data blocks once a selected minimum number of data blocks has been captured and stored in memory device 206.

Further, while aspects discussed above focus on parallel data capture and transfer for downlink data received from a base station 106 for illustrative purposes, the systems and methods described can also be used for parallel data capture and transfer for uplink data received from one or more remote units 108a-d. In additional aspects, aspects discussed herein can be utilized in a receiver for a remote unit 108. For example, a remote unit 108 can be configured for parallel capture and processing downlink data from neighboring macro cells.

The foregoing description of the examples, including illustrated examples, of the disclosed subject matter has been presented only for the purpose of illustration and description and is not intended to be exhaustive or to limit the subject matter to the precise forms disclosed. Numerous modifications, adaptations, and uses thereof can be apparent to those skilled in the art without departing from the scope of this subject matter. The illustrative examples described above are given to introduce the reader to the general subject matter discussed here and are not intended to limit the scope of the disclosed concepts.

What is claimed is:

1. A telecommunications system, comprising:
a unit that transports wireless communications between a base station and one or more user devices positioned in a coverage area, the unit including:
an analog-to-digital converter configured for receiving wireless communication signals from the base station and digitizing the wireless communication signals into a first set of downlink data blocks and a second set of downlink data blocks,
a first processing device,
a memory device,
a second processing device communicatively coupled between the analog-to-digital converter, the memory device, and the first processing device, and
a non-transitory computer readable medium communicatively coupled to the second processing device, the non-transitory computer readable medium including program code comprising:
program code for capturing the first set of downlink data blocks;
program code for storing the first set of downlink data blocks to a memory device;
program code for transferring the first set of downlink data blocks to the first processing device subsequent to a selected number of data blocks being stored in the memory device; and
program code for capturing the second set of downlink data blocks substantially simultaneously to transferring the first set of downlink data blocks to the first processing device.

2. The telecommunications system of claim 1, further comprising one or more remote units communicatively coupled to the unit, the one or more remote units configured to provide the first set of downlink data blocks and the second set of downlink data blocks from the unit to one or more user devices.

3. The telecommunications system of claim 1, wherein the selected number of data blocks is inversely proportional to a rate of data transfer between the memory device and the first processing device.

4. The telecommunications system of claim 3, wherein the non-transitory computer readable medium further comprises:
program code for automatically adjusting the selected number of data blocks based on a detected rate of data transfer to the first processing device.

5. The telecommunications system of claim 1, wherein the non-transitory computer readable medium further comprises:
program code for sending an indication to the first processing device, subsequent to a subset of data blocks of the first set of downlink data blocks being transferred for processing.

6. The telecommunications system of claim 5, wherein the subset of data blocks of the first set of downlink data blocks is processed substantially simultaneously to the second set of downlink data blocks being written to the memory device.

7. The telecommunications system of claim 1, wherein the unit is configured as a head-end unit or an extension unit of a distributed antenna system and the first processing device includes a digital signal processor.

8. A method for a unit of a telecommunications system (100), the unit configured to transport wireless communications between a base station and one or more user devices positioned in a coverage area, the method, comprising:
capturing, at a second processing device (204), a first set of digitized downlink data blocks representative of information carried by a radio frequency signal received from a base station;
writing the first set of digitized downlink data blocks by the second processing device to a memory device;
transferring the first set of digitized downlink data blocks to a first processing device subsequent to a selected number of data blocks being stored in the memory device by the second processing device; and
capturing a second set of digitized downlink data blocks substantially, simultaneously to transferring the first set of digitized downlink data blocks to the first processing device.

9. The method of claim 8, wherein the selected number of data blocks is inversely proportional to a rate of data transfer between the memory device and the first processing device.

10. The method of claim 9, further comprising automatically adjusting the selected number of data blocks based on a detected rate of data transfer to the first processing device.

11. The method of claim 8, further comprising sending an indication to the first processing device subsequent to a subset of data blocks of the first set of digitized downlink data blocks being transferred for processing.

12. The method of claim 11, further comprising processing the subset of data blocks of the first set of digitized downlink data blocks substantially simultaneously to the second set of downlink data blocks being written to the memory device.

13. The method of claim 8, further comprising providing the first set of digitized downlink data blocks to one or more remote units of a distributed antenna system, wherein the first set of digitized downlink data blocks carry wireless communication information and wherein the first processing device includes a digital signal processor.

14. A head-end unit, comprising:
an analog-to-digital converter configured for receiving wireless communication signals from a base station and digitizing the wireless communication signals into a first set of downlink data blocks and a second set of downlink data blocks, wherein the head-end unit transports wireless communications between the base station and one or more user devices positioned in a coverage area;
a first processing device; and
a memory device; and
a second processing device communicatively coupled between the analog-to-digital converter, the memory device, and the first processing device, wherein the second processing device is configured to:
capture the first set of downlink data blocks from the analog-to-digital converter;
store the first set of downlink data blocks to the memory device,
transfer the first set of downlink data blocks to a first processing device subsequent to a selected number of data blocks being stored in the memory device; and
capture the second set of downlink data blocks substantially simultaneously to transferring the first set of digitized downlink data blocks to the first processing device.

15. The head-end unit of claim 14, wherein the second processing device is further configured to set the selected number of data blocks by adjusting a register setting in the second processing device.

16. The head-end unit of claim 15, wherein the selected number of data blocks is inversely proportional to a rate of data transfer between the memory device and the first processing device.

17. The head-end unit of claim 14, wherein the second processing device is further configured to send an indication, to the first processing device, subsequent to a subset of data blocks of the first set of downlink data blocks being transferred for processing.

18. The head-end unit of claim 17, wherein the first processing device is further configured for processing the subset of data blocks of the first set of downlink data blocks substantially simultaneously to the second set of downlink data blocks being written to the memory device.

19. The head-end unit of claim 14, wherein the second processing device includes:

a double data rate type 3 data capture module configured to capture the first set of downlink data blocks and the second set of downlink data blocks from the analog-to-digital converter, and a double data rate type 3 controller module communicatively coupled to the double data rate type 3 data capture module and to the memory device, the double data rate type 3 controller module configured to:

store the first set of downlink data blocks and the second set of downlink data blocks to the memory device, and transfer the first set of downlink data blocks and the second set of downlink data blocks to the first processing device via the double data rate type 3 data capture module.

20. The head-end unit of claim 14, wherein the head-end unit is configured for providing the first set of downlink data blocks and the second set of downlink data blocks to one or more remote units in a distributed antenna system and wherein the first processing device includes a digital signal processor.

* * * * *